(No Model.)
S. G. CABELL.
APPARATUS FOR AGING LIQUORS.
No. 341,727.          Patented May 11, 1886.
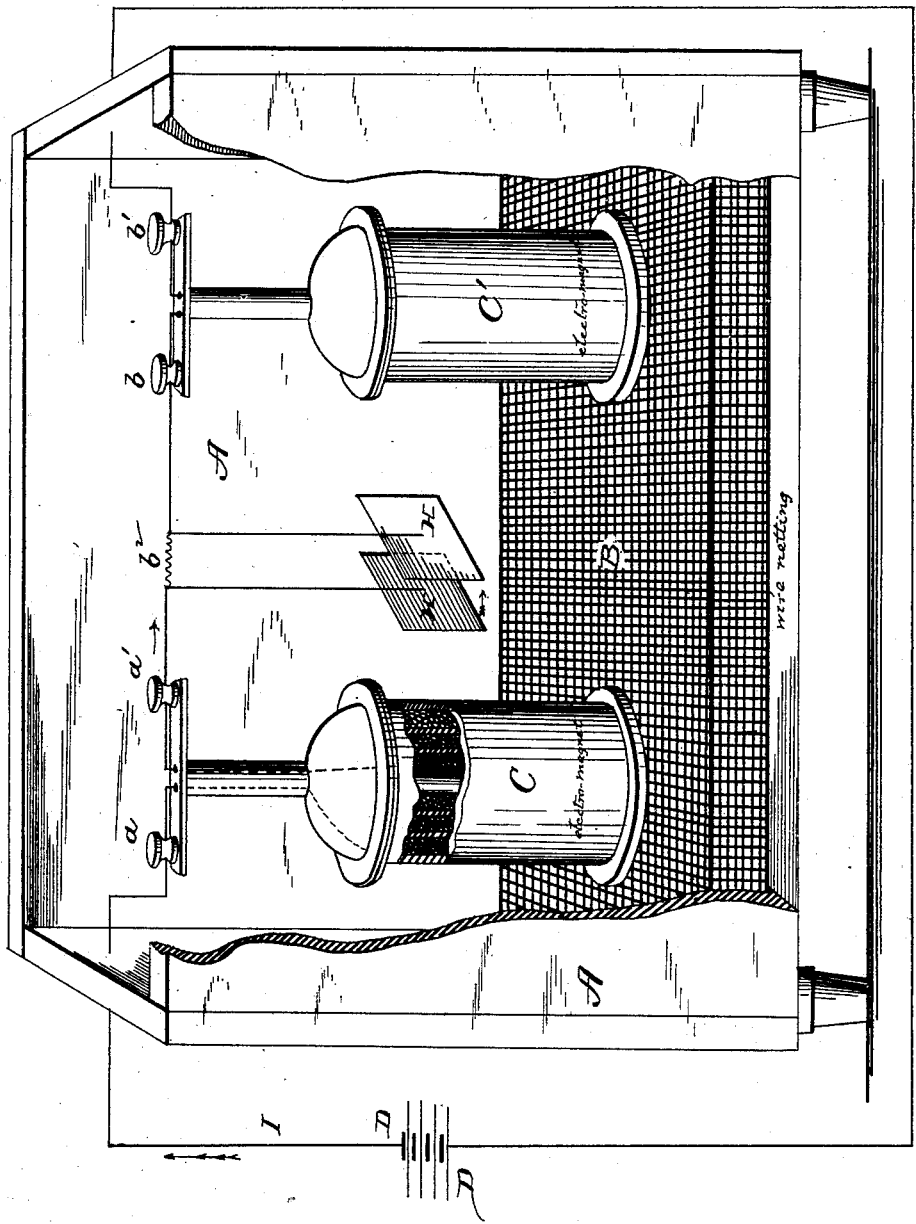
Witnesses:
Wm U. Rosenbaum
Frank S. Ober.
Inventor
Samuel G. Cabell
by V. D. Stockbridge.
Atty.

UNITED STATES PATENT OFFICE.

SAMUEL G. CABELL, OF WASHINGTON, DISTRICT OF COLUMBIA, ASSIGNOR TO PETER E. ILER, OF OMAHA, NEBRASKA, MILTON S. CABELL, OF QUINCY, ILLINOIS, AND FLORA B. CABELL, OF WASHINGTON, D. C.

APPARATUS FOR AGING LIQUORS.

SPECIFICATION forming part of Letters Patent No. 341,727, dated May 11, 1886.

Application filed July 1, 1885. Serial No. 170,395. (No model.)

*To all whom it may concern:*

Be it known that I, SAMUEL G. CABELL, a citizen of the United States, residing at Washington, in the District of Columbia, have invented certain new and useful Improvements in Aging Liquors; and I do hereby declare the following to be a full, clear, and exact description of the invention, such as will enable others skilled in the art to which it appertains to make and use the same.

My invention relates to a new process and apparatus for aging and purifying distilled and other liquors; and it consists, essentially, in charging, impregnating, or otherwise affecting a volume of liquor by or with the presence of magnetism and electricity.

Liquor impregnated by or treated in the presence of magnetism and electricity for a few hours is purified or its condition changed, apparently, to the same grade of liquor many years old. It is certainly improved in taste and smell, and its actual and commercial value is greatly enhanced.

According to my understanding the electric and electro-magnetic effects operate to release the oxygen contained in the liquor and ozonizes the same, the ozone oxidizes and completely destroys the fusil-oil and the aldehyde contained in high wines, thereby relieving the liquor of disagreeable or offensive odors as well as elements deleterious to health.

An apparatus for carrying out this process I have illustrated in the accompanying drawings, but I do not confine myself to its particular construction, as the details may be altered in any manner, provided the principal of my invention be carried out.

The figure illustrates a battery and a tank or vat, partially broken away, showing within it the apparatus for carrying out my invention.

A represents a vat, which should be constructed of wood or any other non-conductor of electricity.

B represents several layers of wire-netting or a body of iron-scrap of any kind. This wire-netting or iron-scrap may obviously be arranged in any desired shape, so as to extend through the volume of liquor in different directions, and thus because of the body-surface and ramifications more thoroughly magnetize, impregnate, or affect the liquor.

C C' are electro-magnets arranged within the vats or tank whose cores are in contact with the wire-netting or body of iron. These magnets may be of any suitable structure and size, although I prefer the compound magnet illustrated, and that they shall be of considerable size and power.

D D represent a battery for the generation of electricity. It may be of any approved construction or consist of any means of generating a current. I propose to use in this connection a thermal battery; but have in the drawings made the conventional representation of a battery merely to indicate a source of electricity.

H H are platinum or other metallic plates or electrodes suspended within the tank and near the middle of the body of liquor, at the proper distance apart, according to the strength of current inside, so that the resistance of the liquid may not practically obstruct the current therethrough.

I I' are the conducting-wires leading from a pole of the battery back to the other, to form a circuit.

Suitable binding-posts, $a$ $a'$ $b$ $b'$, are provided for making connections, as shown.

The operation of my invention is as follows: The tank or vat is first supplied with liquor until the plates or electrodes are entirely submerged. The circuits are then coupled up so that the current will take the following course. From the battery along wire I to binding-post $a$, along wire, as shown, through coil in magnet C to binding-post $a'$ to plate, thence across through the liquid to the opposite plate or electrodes, to binding-post $b$, through magnet C' to binding-post $b'$, and finally along wire I' to battery, to complete the circuit. I sometimes connect the principal conductors above the liquid by a very fine wire, $b^2$, or other high resistant conductor, as shown, so as to insure some current through the coils for magnetizing the cores and body of iron in the tank at all times.

It is obvious that a single magnet would operate on the same principle as would two or more, and it is also obvious that two or more pairs of platinum plates may be introduced, instead of one pair, without departing from the principle of my invention. It is also observed that an insulated metallic vessel or tank may be used instead of a wooden vessel, in which case the body of wire or other metal at the bottom may be dispensed with. It is further observed that the purifying apparatus may be introduced to the fermenting-tub, or in any of the still-chambers between it and the worm as well as in the high-wine tub.

Having now described my invention, what I claim, and desire to secure by Letters Patent, is—

1. The combination, with a vat or tank for purifying liquors, of an electro-magnet in contact with a body of metal within the liquor and a source of electricity, substantially as described.

2. The combination, with a vat or tank, of one or more electro-magnets, one or more pairs of electrodes, and a source of electricity, whereby the contents of the tank are influenced or charged by electricity and magnetism and the liquor purified and aged, substantially as described.

3. The combination, with a vat or tank, of an electro-magnet, a body of iron within the tank, a pair of electrodes, and a source of electricity, substantially as described.

4. The combination, with a vat or tank, of an electro-magnet, a pair of electrodes, a connection between the conductors, as $b$, and a source of electricity, substantially as described.

5. The combination of a tank, an electro-magnet, a body of iron within the tank, a pair of electrodes, and a source of electricity, as and for the purpose specified.

In testimony whereof I affix my signature in presence of two witnesses.

SAMUEL G. CABELL.

Witnesses:
 WM. A. ROSENBAUM,
 FRANK S. OBER.